(12) United States Patent
Alexander et al.

(10) Patent No.: US 9,250,913 B2
(45) Date of Patent: Feb. 2, 2016

(54) COLLISION-BASED ALTERNATE HASHING (75) Inventors: Khary J. Alexander, Poughkeepsie, NY (US); Ilia Averbouch, Haifa (IL); Ariel J. Birnbaum, Kiryat Motzkin (IL); Jonathan T. Hsieh, Poughkeepsie, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 13/524,139

(22) Filed: Jun. 15, 2012

(65) Prior Publication Data

US 2013/0339665 A1    Dec. 19, 2013

(51) Int. Cl.
*G06F 9/38* (2006.01)
(52) U.S. Cl.
CPC ............ *G06F 9/3806* (2013.01); *G06F 9/3804* (2013.01)
(58) Field of Classification Search
None
See application file for complete search history.

(56) References Cited

U.S. PATENT DOCUMENTS 5,530,958 A * 6/1996 Agarwal et al. .................... 711/3

OTHER PUBLICATIONS

A. Broder, et al., "Multilevel Adaptive Hashing," Proceedings of the 1st ACM-SIAM Symposium on Discrete Algorithms (SODA), 1990, pp. 43-53.

A. Kirsch, et al., "The Power of One Move: Hashing Schemes for Hardware," with M. Mitzenmacher. IEEE/ACM Transactions on Networking, 2010. pp. 1-9.

Lu, et al. "Perfect Hashing for Network Applications." IEEE International Symposium on Information Theory, Jul. 9-14, 2006. pp. 2774-2778.

M. V. Ramakrishna et al., "A Performance Study of Hashing Functions for Hardware Applications," International Conference on Computing and Information, 1994. pp. 1621-1636.

Widiger, et al., "Accelerating the Evolution of Evolvable Hardware-based Packet Classifiers," Proceedings of the 2007 IEEE Workshop on Evolvable and Adaptive Hardware. pp. 27-34.

* cited by examiner

*Primary Examiner* — Corey S Faherty
(74) *Attorney, Agent, or Firm* — Cantor Colburn LLP; Margaret McNamara (57) ABSTRACT

Embodiments relate to collision-based alternate hashing. An aspect includes receiving an incoming instruction address. Another aspect includes determining whether an entry for the incoming instruction address exists in a history table based on a hash of the incoming instruction address. Another aspect includes based on determining that the entry for the incoming instruction address exists in the history table, determining whether the incoming instruction address matches an address tag in the determined entry. Another aspect includes based on determining that the incoming instruction address does not match the address tag in the determined entry, determining whether a collision exists for the incoming instruction address. Another aspect includes based on determining that the collision exists for the incoming instruction address, activating alternate hashing for the incoming instruction address using an alternate hash buffer.

4 Claims, 5 Drawing Sheets

HISTORY TABLE 204

| ADDRESS TAG 212A | LIVENESS COUNTER 213A | CONFLICT COUNTER 214A |
|---|---|---|
| ADDRESS TAG 212B | LIVENESS COUNTER 213B | CONFLICT COUNTER 214B |
| ADDRESS TAG 212C | LIVENESS COUNTER 213C | CONFLICT COUNTER 214C |
| ADDRESS TAG 212N | LIVENESS COUNTER 213N | CONFLICT COUNTER 214N |

ALTERNATE HASH BUFFER 205

| INSTRUCTION ADDRESS 215A | INSTRUCTION ADDRESS ALTERNATE HASH 216A |
|---|---|
| INSTRUCTION ADDRESS 215B | INSTRUCTION ADDRESS ALTERNATE HASH 216B |

COLLISION-BASED ALTERNATE HASHING

BACKGROUND

The present invention relates generally to computer processors, and more specifically, to collision-based alternate hashing in a processor.

In a computing system, the main computer memory may be relatively slow compared to the computer processor; therefore, one or more caches may be provided in the processor to reduce or avoid accesses to the main memory. A cache is a relatively small, high-speed buffer of memory placed between the processor and the main memory that holds most recently used sections of the main memory for use by the processor. The sections of memory that are stored in the cache are referred to as a cache lines. Any request made by the processor that is satisfied by the cache may be completed relatively quickly. However, when a request by the processor is not satisfied by the cache, a cache miss occurs, which may cause delays in the processor while the request is satisfied from the main memory.

Prefetching is a technique that is used to reduce delays to the processor caused by cache misses. Prefetching attempts to predict requests (for example, requests for instructions or operands) that will be made by the processor and stage lines of memory into the cache before the processor requests them. If prefetching is successful, cache lines are transferred from the main memory into the cache before the processor requests them, avoiding cache misses and reducing overall latency in the processor. Prefetching may be performed based on a history table that holds the recent history of instructions in the processor indexed by instruction address. Event streams, including cache misses, associated with particular instruction addresses that appear repeatedly during program execution may form patterns that trigger insertion of prefetch requests into the processor pipeline.

SUMMARY

Embodiments include a method, system, and computer program product for collision-based alternate hashing. An aspect includes receiving an incoming instruction address. Another aspect includes determining whether an entry for the incoming instruction address exists in a history table based on a hash of the incoming instruction address. Another aspect includes based on determining that the entry for the incoming instruction address exists in the history table, determining whether the incoming instruction address matches an address tag in the determined entry. Another aspect includes based on determining that the incoming instruction address does not match the address tag in the determined entry, determining whether a collision exists for the incoming instruction address. Yet another aspect includes based on determining that the collision exists for the incoming instruction address, activating alternate hashing for the incoming instruction address using an alternate hash buffer.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Systems and methods for collision-based alternate hashing in a processor are provided, with exemplary embodiments being discussed below in detail. Because the storage available in the history table may be relatively small as compared to the range of possible event stream identifiers (i.e., instruction addresses), a hashing function may be used to determine a hash of incoming instruction addresses, and data associated with the incoming instruction address may be stored at a location in the history table based on the hash of the instruction address. However, use of a single hashing function to map the instruction addresses to storage locations in the history table may result in collisions when instruction addresses map to the same hash. Such collisions may impede independent tracking of distinct event streams. Therefore, in response to detected hash collisions between event streams, the hashing scheme used to store data in the history table may be varied dynamically. This allows multiple event streams that have the same instruction address hash to be tracked separately, increasing the amount data available in the history table for use in issuance of prefetch requests.

Three event stream collision scenarios that may be detected. In a first scenario, the incumbent event stream (i.e. the event stream currently stored in the history table) may form an active pattern, while the contending event stream (i.e. the event stream attempting to access the history table) does not form an active pattern. In a second scenario, the incumbent instruction may not form a pattern, or its pattern may no longer be relevant, while the contending one does form a pattern. In the third scenario, both event streams may form an active pattern, which may trigger alternate hashing for the instruction address for one of the event streams.

Collisions between active event streams may be detected based on various fields in the history table, including an address tag comprising additional bits from the instruction address, and a liveness counter comprising an unsigned integer quantity in a given range. The address tag and liveness counter may be added to each history table entry upon creation, with the liveness counter being initialized to a fixed liveness value. For an incoming instruction address, a history table entry is determined based on the hash function of the instruction address, and the address tag is compared to the instruction address to determine the presence of a collision. If the address tag bits match, the liveness counter in the entry is incremented to the fixed liveness value to indicate that the incumbent entry is active. If there is a mismatch between the incoming instruction address and the address tag in the history table entry, the liveness counter is decremented by a fixed amount (e.g., 1) to indicate that the incumbent entry is becoming stale. When the liveness counter for a history table entry drops below a liveness threshold, the entry may be replaced by an entry associated with the contending instruction address.

If two colliding instruction addresses have active event streams, a sequence of alternating increments and decrements of the liveness counter for the history table entry associated with the hash of the colliding instruction addresses will be observed. Therefore, a liveness counter that is higher than a liveness counter threshold may indicate an active collision. The liveness counter threshold is lower than the fixed liveness value. The number of collisions detected for a given instruction address hash is also tracked. The number of collisions may be tracked in a separate side buffer or in the history table entry itself in various embodiments. When the number of conflicts for a given instruction address hash exceeds a conflict threshold, and the history table entry for the instruction address hash also has a liveness counter that is higher than the liveness counter threshold, alternate hashing for the hash value may be activated. Alternate hashing is implemented using an alternate hash buffer that stores a list of instruction addresses for which collisions have been detected. The alternate hash buffer may comprise a content addressable memory (CAM) in some embodiments. The hashing function used to access the history table for one of the colliding event streams may be changed based on the alternate hash buffer entry for the instruction address of the event stream. This allows the incumbent and contending instruction addresses to be mapped to different history table entries, so that they may be tracked separately.

Figure 1:
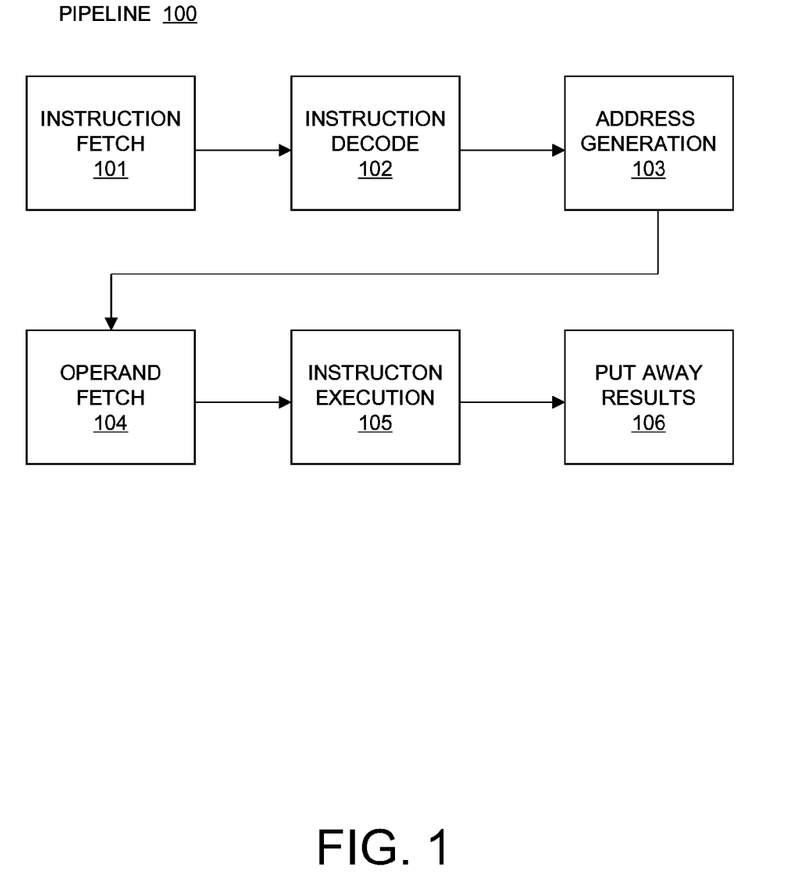
FIG. 1 depicts a pipeline in accordance with an embodiment.

FIG. 1 depicts a pipeline 100 for a processor in accordance with an embodiment. The pipeline 100 includes an instruction fetch stage 101, an instruction decode stage 102, an address generation stage 103, an operand fetch stage 104, an instruction execution stage 105, and a put away of results stage 106. Each instruction may enter the pipeline and spend one cycle at each pipeline stage. If the pipeline 100 is kept full of requests that are being processed, then each pipeline component 101-106 is kept active, and a request may be completed every pipeline cycle. The pipeline 100 may be used in conjunction with one or more caches, such as an instruction cache and an operand cache. Cache misses that occur in the instruction fetch stage 101 or operand fetch stage 104 may slow down operation of the pipeline 100.

Figure 2A:
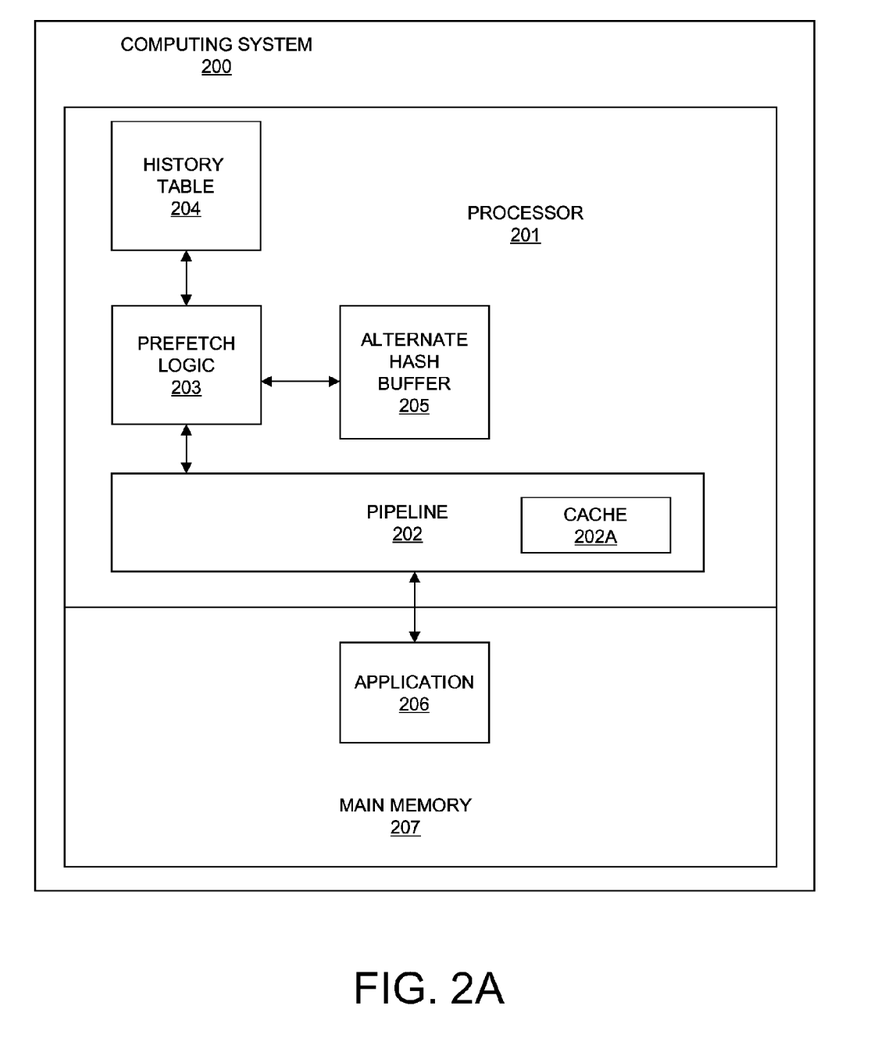
FIGS. 2A-B depict a computing system for collision-based alternate hashing in accordance with an embodiment.
Figure 2B:
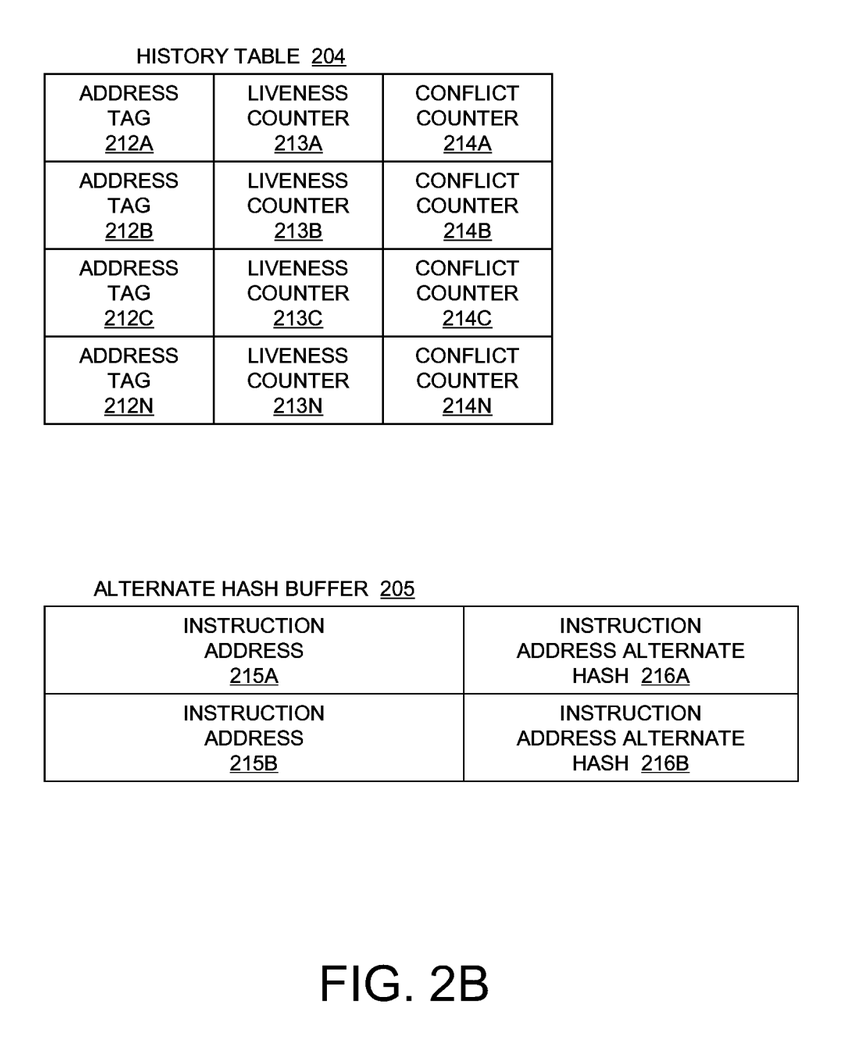

FIGS. 2A-B illustrates an embodiment of a computing system 200 for collision-based hashing for prefetching. Computing system 200 as shown in FIG. 2A includes a processor 201 and a main memory 207. During execution of an application 206 by the processor 201, instructions are issued to the pipeline 202. Pipeline 202 may comprise the pipeline stages that were illustrated with respect to pipeline 100 of FIG. 1. The pipeline 202 additionally includes cache 202A. The prefetch logic 203 issues prefetch requests into pipeline 202 based on the information in history table 204. These prefetch requests act to retrieve lines from the main memory 207 to the cache 202A before the lines are needed in the pipeline 202. Prefetch logic 203 additionally determines patterns in cache misses in pipeline 202 using history table 204, and may automatically issue prefetch requests to pipeline 202 based on determined patterns. Information regarding cache misses in pipeline 202 is stored in history table 204 based on a hash of the instruction address associated with each cache miss. Alternate hash buffer 205 holds data for instruction addresses for which alternate hashing in history table 204 has been activated by prefetch logic 203. Alternate hash buffer 205 may comprise a CAM in some embodiments.

FIG. 2B show embodiments of the history table 204 and the alternate hash buffer 205. The history table 204 includes a plurality of entries, each entry comprising a respective address tag 212A-N, liveness counter 213A-N, and conflict counter 214A-N. Each entry in the history table 204 is indexed by a particular hash value. The alternate hash buffer 205 also includes a plurality of entries, each entry comprising a respective instruction address 215A-B and instruction address alternate hash 216A-B. History table 204 and alternate hash buffer 205 are shown for illustrative purposes only; a history table and alternate hash buffer for use in processor 201 may each include any appropriate number of entries. Further, the conflict counters 214A-N as shown in the history table 204 may be located in a side buffer in some embodiments instead of in the history table 204.

Figure 3:
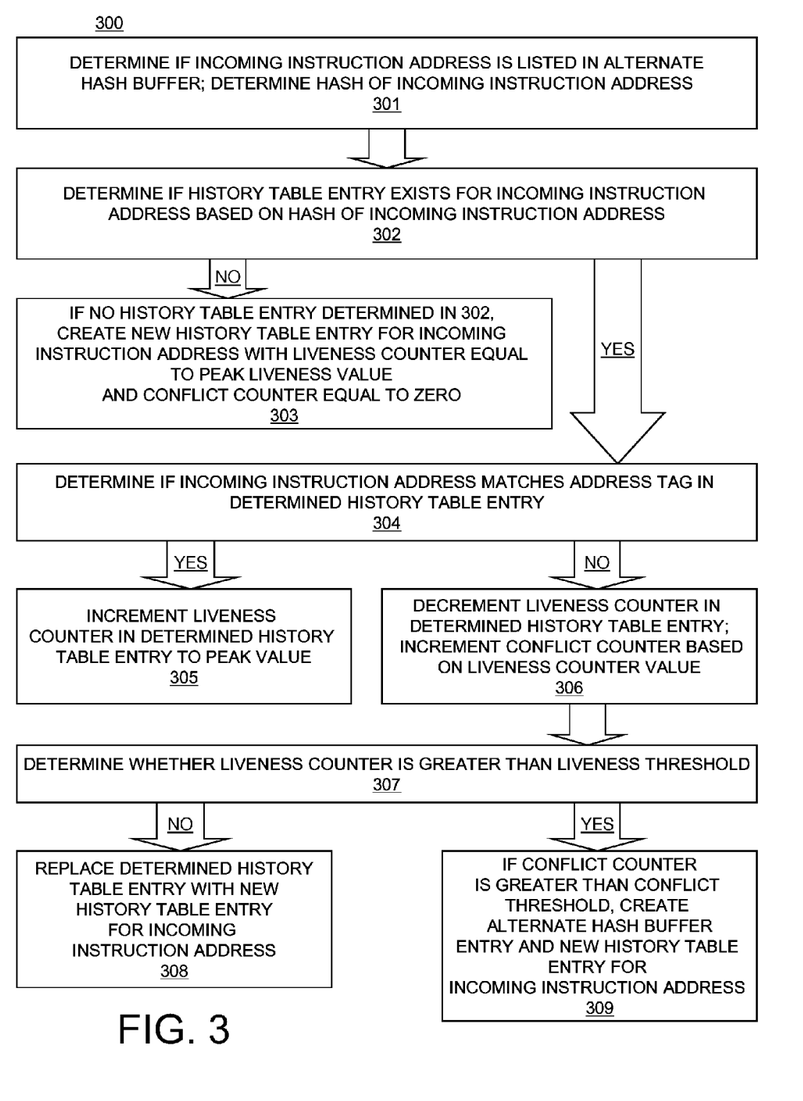
FIG. 3 depicts a process flow for collision-based alternate hashing in accordance with an embodiment.

FIG. 3 illustrates a flowchart of an embodiment of a method 300 for collision-based alternate hashing. FIG. 3 is discussed with respect to FIGS. 2A-B. Method 300 is repeated by prefetch logic 203 for each incoming instruction address. An incoming instruction address may be associated with, for example, a cache miss in pipeline 202. First, in block 301, the prefetch logic 203 determines a hash of an incoming instruction address. This determination is made based on the alternate hash buffer 205. If the instruction address is not listed in the alternate hash buffer 205, a default hashing scheme is used to determine the hash of the incoming instruction address in block 301. If the instruction address is listed in the alternate hash buffer 205, in for example, entry 215A-216A, the alternate hash 216A is determined to be the hash of the incoming instruction address. Next, in block 302, prefetch logic 203 determines whether an entry in history table 204 exists for the incoming instruction address based on the hash of the instruction address that was determined in block 301. If no entry for the hash of the incoming instruction address exists in the history table 204, flow proceeds to block 303, in which an entry (for example, entry 212N-214N) is created in the history table 204 for the hash of the instruction address, including address tag 212N. The liveness counter 213N is initially set to a fixed liveness value, and the conflict counter 214N is set to zero, and method 300 ends. The fixed liveness value may have any appropriate value.

If it was determined in block 302 of method 300 that an entry (for example, incumbent entry 212A-214A) for the hash of the incoming instruction address exists in the history table 204, flow proceeds to block 304, in which the incoming instruction address is compared to the address tag 212A of the identified entry 212A-214A in the history table 204. If it is determined in block 304 that the incoming instruction address matches the address tag 212A, flow then proceeds to block 305, in which the liveness counter 213A is incremented to a fixed liveness value, and flow of method 300 ends. However, if it was determined in block 304 that the incoming instruction address does not match the address tag 212A, a collision is detected, and flow then proceeds to block 306 of method 300. In block 306, the liveness counter 213A is decremented in the determined history table entry, and the conflict counter 214A that is associated with the history table entry is incremented. In some embodiments, the conflict counter 214A may be incremented only if the liveness counter 213A of the incumbent entry is above a liveness threshold, because if the liveness counter 213A is below the liveness threshold, the incumbent entry 212A-214A is not being actively used by its current incumbent occupant and there is no reason to activate the alternative hash function for it.

Flow then proceeds to block 307, in which the liveness counter 213A in the history table entry is compared to a liveness threshold. The liveness threshold may have any appropriate value. If it is determined in block 307 that liveness counter 213A is less than a liveness threshold, flow proceeds to block 308, in which the determined entry in the history table is replaced with a new entry corresponding to the incoming instruction address. The the address tag 212A is determined from the incoming instruction address, and the liveness counter 213A is initialized to the fixed liveness value, and method 300 ends.

Lastly, if it is determined in block 307 that the liveness counter 213A is greater than the liveness threshold, flow proceeds from block 307 to block 309, in which the conflict counter 214A is compared to a conflict threshold to determine if alternate hashing is needed. The conflict threshold may have any appropriate value. If the conflict counter 214A is determined to be greater than the conflict threshold, an entry is created in alternate hash buffer 205 for the incoming instruction address, in addition to a new history table entry that is indexed based on the alternate hash of the incoming instruction address. The alternate hash buffer entry (for example, entry 215A-216A) includes the instruction address 215A and the alternate hash 216A for the instruction address. The new history table entry (for example, entry 212N-214N) has the alternate hash 216A inserted as instruction address hash 212N, additional bits of the incoming instruction address as address tag 212N. The liveness counter 213N is initially set to a fixed liveness value, and the conflict counter 214N is set to zero, and method 300 ends.

In the event an incoming instruction address is received for which alternate hashing is activated, flow of method 300 proceeds as follows. In block 301, it is determined based on alternate hash buffer 205 that an alternate hash 216A exists for an incoming instruction address 215A. This alternate address hash 216A is used to determine the entry in the history table 204 for the incoming instruction address 215A in block 302, and flow proceeds from block 302 to block 304 of method 300. Because alternate hashing has been activated for the instruction address, the address tag 212A will match the incoming instruction address 215A in block 304, and flow will proceed to block 305, in which the liveness counter 213A will be incremented to the fixed liveness value, indicating an active entry in history table 204, and method 300 ends.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
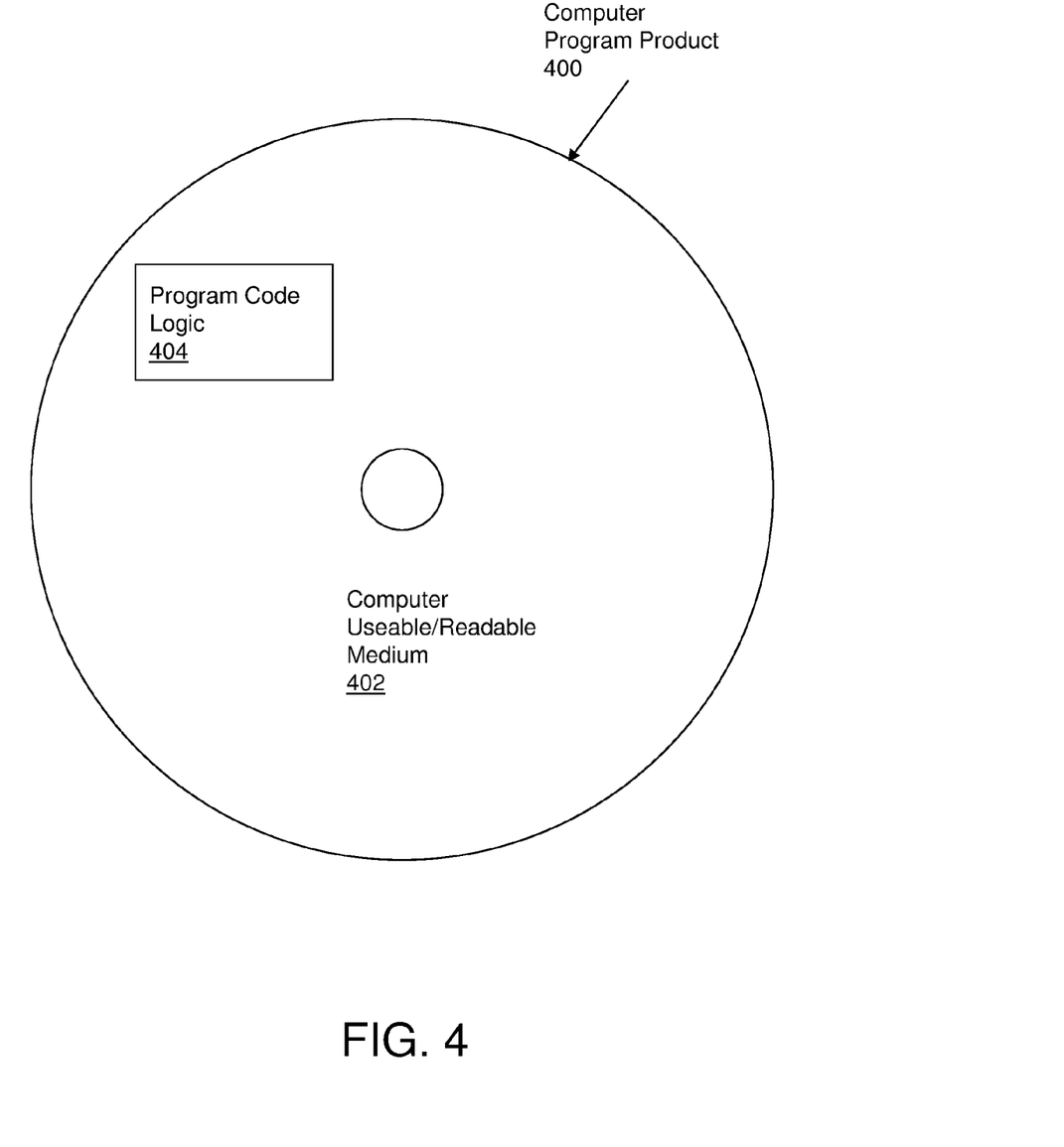
FIG. 4 illustrates a computer program product in accordance with an embodiment.

Referring now to FIG. 4, in one example, a computer program product 400 includes, for instance, one or more storage media 402, wherein the media may be tangible and/or non-transitory, to store computer readable program code means or logic 404 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a method, system, and computer program product for collision-based alternate hashing. An aspect includes receiving an incoming instruction address. Another aspect includes determining whether an entry for the incoming instruction address exists in a history table based on a hash of the incoming instruction address. Another aspect includes based on determining that the entry for the incoming instruction address exists in the history table, determining whether the incoming instruction address matches an address tag in the determined entry. Another aspect includes based on determining that the incoming instruction address does not match the address tag in the determined entry, determining whether a collision exists for the incoming instruction address. Yet another aspect includes based on determining that the collision exists for the incoming instruction address, activating alternate hashing for the incoming instruction address using an alternate hash buffer.

In an embodiment, the method, system, and computer program product further include based on determining that the entry for the incoming instruction address does not exist in the history table, creating an entry for the incoming instruction address in the history table, the created entry comprising the hash of the incoming instruction address, an address tag, and a liveness counter, wherein the liveness counter is initialized to a fixed liveness value, and associating a conflict counter with the created entry, wherein the conflict counter is initialized to zero.

In an embodiment, the conflict counter is located in the history table entry.

In an embodiment, the conflict counter is located in a side table.

In an embodiment, the method, system, and computer program product further include based on determining that the incoming instruction address matches the address tag in the determined entry, incrementing a liveness counter in the determined entry to a fixed liveness value.

In an embodiment, determining whether the collision exists for the incoming instruction address includes decrementing a liveness counter in the determined entry; incrementing a conflict counter associated with the determined entry; determining whether the liveness counter is greater than a liveness threshold, and whether the conflict counter is greater than a conflict threshold; and based on determining that the liveness counter is greater than the liveness threshold and that the conflict counter is greater than the conflict threshold, determining that the collision exists for the incoming instruction address.

In an embodiment, the method, system, and computer program product further include based on the liveness counter being less than the liveness threshold, replacing the determined entry with a new history table entry for the incoming instruction address.

In an embodiment, activating alternate hashing for the incoming instruction address using the alternate hash buffer comprises creating an entry in the alternate hash buffer for the incoming instruction address, the entry in the alternate hash buffer comprising the incoming instruction address and an alternate hash of the incoming instruction address.

In an embodiment, the method, system, and computer program product further include determining whether an alternate hash for the incoming instruction address exists in the alternate hash buffer; and based on determining that the alternate hash for the incoming instruction address exists in the alternate hash buffer, determining whether the entry for the incoming instruction address exists in the history table based on the alternate hash.

In an embodiment, the incoming instruction address is associated with a cache miss in a pipeline of the processor, and wherein the prefetch logic is configured to issue prefetch instructions into the pipeline based on the history table.

Technical effects and benefits include separate tracking of colliding event streams in a processor, which gives additional information that may be used in the issuance of prefetch requests.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for collision-based alternate hashing, the system comprising:
 a processor, the processor comprising a prefetch logic, a history table, and an alternate hash buffer, the system configured to perform a method comprising:
  receiving, by the prefetch logic, an incoming instruction address;
  determining whether an entry for the incoming instruction address exists in the history table based on a hash of the incoming instruction address;
  based on determining that the entry for the incoming instruction address exists in the history table, determining whether the incoming instruction address matches an address tag in the determined entry;

based on determining that the incoming instruction address does not match the address tag in the determined entry, determining whether a collision exists for the incoming instruction address, wherein determining whether the collision exists for the incoming instruction address comprises:

decrementing a liveness counter in the determined entry;

incrementing a conflict counter associated with the determined entry;

determining whether the liveness counter is greater than a liveness threshold, and whether the conflict counter is greater than a conflict threshold; and based on determining that the liveness counter is greater than the liveness threshold and that the conflict counter is greater than the conflict threshold, determining that the collision exists for the incoming instruction address; and based on determining that the collision exists for the incoming instruction address, activating alternate hashing for the incoming instruction address using the alternate hash buffer.

2. The computer system of claim 1, further comprising, based on the liveness counter being less than the liveness threshold, replacing the determined entry with a new history table entry for the incoming instruction address.

3. A computer implemented method for collision-based alternate hashing, the method comprising:

receiving, by prefetch logic in a processor of the computer, an incoming instruction address;

determining whether an entry for the incoming instruction address exists in a history table based on a hash of the incoming instruction address;

based on determining that the entry for the incoming instruction address exists in the history table, determining whether the incoming instruction address matches an address tag in the determined entry;

based on determining that the incoming instruction address does not match the address tag in the determined entry, determining whether a collision exists for the incoming instruction address, wherein determining whether the collision exists for the incoming instruction address comprises:

decrementing a liveness counter in the determined entry;

incrementing a conflict counter associated with the determined entry;

determining whether the liveness counter is greater than a liveness threshold, and whether the conflict counter is greater than a conflict threshold; and based on determining that the liveness counter is greater than the liveness threshold and that the conflict counter is greater than the conflict threshold, determining that the collision exists for the incoming instruction address; and based on determining that the collision exists for the incoming instruction address, activating alternate hashing for the incoming instruction address using an alternate hash buffer.

4. A computer program product for implementing a collision-based alternate hashing, the computer program product comprising:

a non-transitory tangible storage medium readable by a processing circuit and storing instructions for execution by the processing circuit for performing a method comprising:

receiving, by prefetch logic in a processor of a computer, an incoming instruction address;

determining whether an entry for the incoming instruction address exists in a history table based on a hash of the incoming instruction address;

based on determining that the entry for the incoming instruction address exists in the history table, determining whether the incoming instruction address matches an address tag in the determined entry;

based on determining that the incoming instruction address does not match the address tag in the determined entry, determining whether a collision exists for the incoming instruction address, wherein determining whether the collision exists for the incoming instruction address comprises:

decrementing a liveness counter in the determined entry;

incrementing a conflict counter associated with the determined entry;

determining whether the liveness counter is greater than a liveness threshold, and whether the conflict counter is greater than a conflict threshold; and based on determining that the liveness counter is greater than the liveness threshold and that the conflict counter is greater than the conflict threshold, determining that the collision exists for the incoming instruction address; and based on determining that the collision exists for the incoming instruction address, activating alternate hashing for the incoming instruction address using an alternate hash buffer.

* * * * *